(12) United States Patent
Hamagishi et al.

(10) Patent No.: US 6,337,721 B1
(45) Date of Patent: Jan. 8, 2002

(54) STEREOSCOPIC DISPLAY

(75) Inventors: Goro Hamagishi, Toyonaka; Masutaka Inoue, Neyagawa, both of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/396,437

(22) Filed: Sep. 15, 1999

(30) Foreign Application Priority Data

Sep. 18, 1998 (JP) ............................................. 10-264395

(51) Int. Cl.[7] .......................... G02F 1/1335; G02B 27/22

(52) U.S. Cl. ............................ 349/15; 349/64; 359/465; 359/463

(58) Field of Search ............................ 349/15, 112, 69, 349/110; 359/465, 464, 463

(56) References Cited

U.S. PATENT DOCUMENTS

| | | | | |
|---|---|---|---|---|
| 5,465,175 A | * | 11/1995 | Woodgate et al. | 359/463 |
| 5,644,369 A | * | 7/1997 | Jachimowicz et al. | 349/112 |
| 5,861,931 A | * | 1/1999 | Gillian et al. | 349/15 |
| 6,046,849 A | * | 4/2000 | Moseley et al. | 359/465 |

OTHER PUBLICATIONS

Abstract of Japanese Patent Publ. No. 07270745; dated Oct. 20, 1995.
Abstract of Japanese Patent Publ. No. 07287196; dated Oct. 31, 1995.
Abstract of Japanese Patent Publ. No. 09152668; dated Jun. 10, 1997.

* cited by examiner

*Primary Examiner*—Toan Ton
(74) *Attorney, Agent, or Firm*—Arent Fox Kintner Plotkin & Kahn, PLLC

(57) ABSTRACT

A stereoscopic display, by which a viewer can view a stereoscopic image by striping light and giving the striped light to an LCD panel 1 consisting of a display screen containing a group of left eye pixels and a group of right eye pixels, comprises a first light source 4 arranged apart from the LCD panel 1 by a first distance, a second light source 5 arranged apart from the LCD panel 1 by a second distance, a lenticular screen 6 arranged in front of the first and second light sources 4 and 5, a first diffusing plate 7 for diffusing and transmitting light and forming a striped light image from the first light source, a second diffusing plate 8 for diffusing and transmitting light and forming a striped light image from the second light source, wherein a distance of an optimum viewing position from which a viewer can view a stereoscopic image can be changed by switching between a state where the first light source 4 is on and the first diffusing plate has a diffusing effect and a state where the second light source 5 is on and the second diffusing plate 8 has a diffusing effect.

11 Claims, 4 Drawing Sheets

STEREOSCOPIC DISPLAY

BACKGROUND OF THE INVENTION

1. Field of the Invention

This invention relates to a stereoscopic display by which a viewer can view a stereoscopic image without using special eyeglasses, and more particularly, to a stereoscopic display by which a viewer can view a stereoscopic image even when the viewer moves forward or backward.

2. Description of the Prior Art

Examples of a conventional device for displaying a stereoscopic image without using special eyeglasses include one in which a parallax barrier or a lenticular lens is arranged on a viewer side of a screen of a display panel such as a liquid crystal display (LCD) panel, so that a stereoscopic image can be viewed by separating light from a right eye image and light from a left eye image which are alternately displayed for every other vertical line on the display screen.

There is also a device for displaying a stereoscopic image without using special eyeglasses where light for a left eye and light for a right eye are separately incident on a transmissive-type display panel such as an LCD panel.

In the above-mentioned stereoscopic displays, an optimum viewing position such as an optimum distance between a viewer and a display, is set depending on a structure of a device. If a viewer moves out of a optimum viewing position, the viewer can not view a good stereoscopic image.

A method for expanding a region, where a viewer can view a stereoscopic image, in back and forth, and right and left directions, has been proposed in Japanese Laid-Open Gazette No. 270745/1995 (IPC:G02F 1/13). A device in this document is provided with means for detecting a viewer's position and can switch a shading barrier in accordance with a viewer's movement in back and forth direction with respect to a display panel. To speak more details, laminated elements by an active-barrier method which form and eliminate slits electrically are used as a shading barrier for separating light from a left eye pixel and light from a right eye pixel. Thus, the device in the above document can switch the elements by the active-barrier method to be used in accordance with back and forth movement by the viewer. In order to display a stereoscopic image to a viewer who moves leftward and rightward, the device electrically shifts positions of the slits of elements by the active-barrier method in accordance with the viewer's right and left movement.

In the above mentioned method, however, the structure becomes complicated and cost is high to realize the structure where the slits are electrically shifted in a horizontal direction. Furthermore, it is very difficult to laminate the elements by the active-barrier method at a real production site. As a result, the cost becomes too high to manufacture such a device.

Although it is possible merely to superimpose a TN type LCD panel or the like instead of laminating the elements, it generates a gap double as thick as a glass substrate used in the LCD panel structurally between shading barriers, and it causes inconvenience in finely adjusting a normal viewing distance.

Other method for detecting a viewer's head position and expanding a region where a viewer can view a stereoscopic image in accordance with a right and left movement by the viewer has been proposed in Japanese Laid-Open Gazette No. 152668/1997. A stereoscopic picture display device without requiring special eye-glasses, in the document, can expand a region where a viewer can view a stereoscopic image by replacing a right eye image and a left eye image on a display panel of the stereoscopic display in accordance with a position of the viewer's head, whereby the stereoscopic display enables the viewer to view a stereoscopic image in both stereoscopic region and pseudo-stereoscopic region. The method is effective against the viewer's movement in a horizontal direction and capable of expanding a stereoscopic viewing region dramatically.

The method, however, is not effective against the viewer's movement in back and forth direction. The problem occurred when a viewer moves forward and backward has not been solved yet.

SUMMARY OF THE INVENTION

A present invention has been made to solve the above mentioned problems and has an objective to provide a stereoscopic display without using special eye-glasses, which can expand a range where a stereoscopic image can be viewed in back and forth directions can be manufactured at a relatively low cost.

A viewer can view a stereoscopic view by using a stereoscopic display according to the present invention, which stripes light and gives the striped light to an LCD panel consisting of a display screen containing a group of left eye pixels and a group of right eye pixels. The stereoscopic display comprises a first light source arranged apart from the LCD panel by a first distance, a second light source arranged apart from the LCD panel by a second distance, a lenticular screen for shrinking striped light images from the light sources and forming the striped light images at the same interval and arranged in front of the first and second light source, a first diffusing means for diffusing and transmitting light and forming a striped light image from the first light source, a second diffusing means for diffusing and transmitting light and forming a striped light image from the second light source, wherein a distance of an optimum viewing from which a viewer can view a stereoscopic image can be changed by switching between a state where the first light source is on and the first diffusing means has a diffusing effect and a state where the second light source is on and the first diffusing means has a diffusing effect.

A dispersion type LCD panel can be used for the diffusing means.

Letting E be an interval between a viewer's pupils, P be an interval between pixels of a LCD panel, C be a distance between the LCD panel and the diffusing plate which forms a striped light image from the light source, an optimum viewing distance D satisfies $D=C(E-P)/P$.

As described above, a normal viewing distance can be expanded in back and forth directions by selecting and switching the first and second light sources and the first and second diffusing means.

The first and second light sources may consist of a first light source for giving a stereoscopic image to a viewer who is in a certain position and a second light source for giving a stereoscopic image to a viewer who is in a position apart in a horizontal direction by approximately a half of a distance between the viewer's pupils from the certain position.

In the stereoscopic display according to the present invention, the above mentioned two systems of the light sources are switched to be turned on and off corresponding to a position of the viewer.

The optimum light source is turned on corresponding to a position of the viewer and an image to be displayed on the LCD panel is switched, whereby the viewer can view a stereoscopic image from any position regardless of a movement in a horizontal direction of the viewer.

Figure 1:
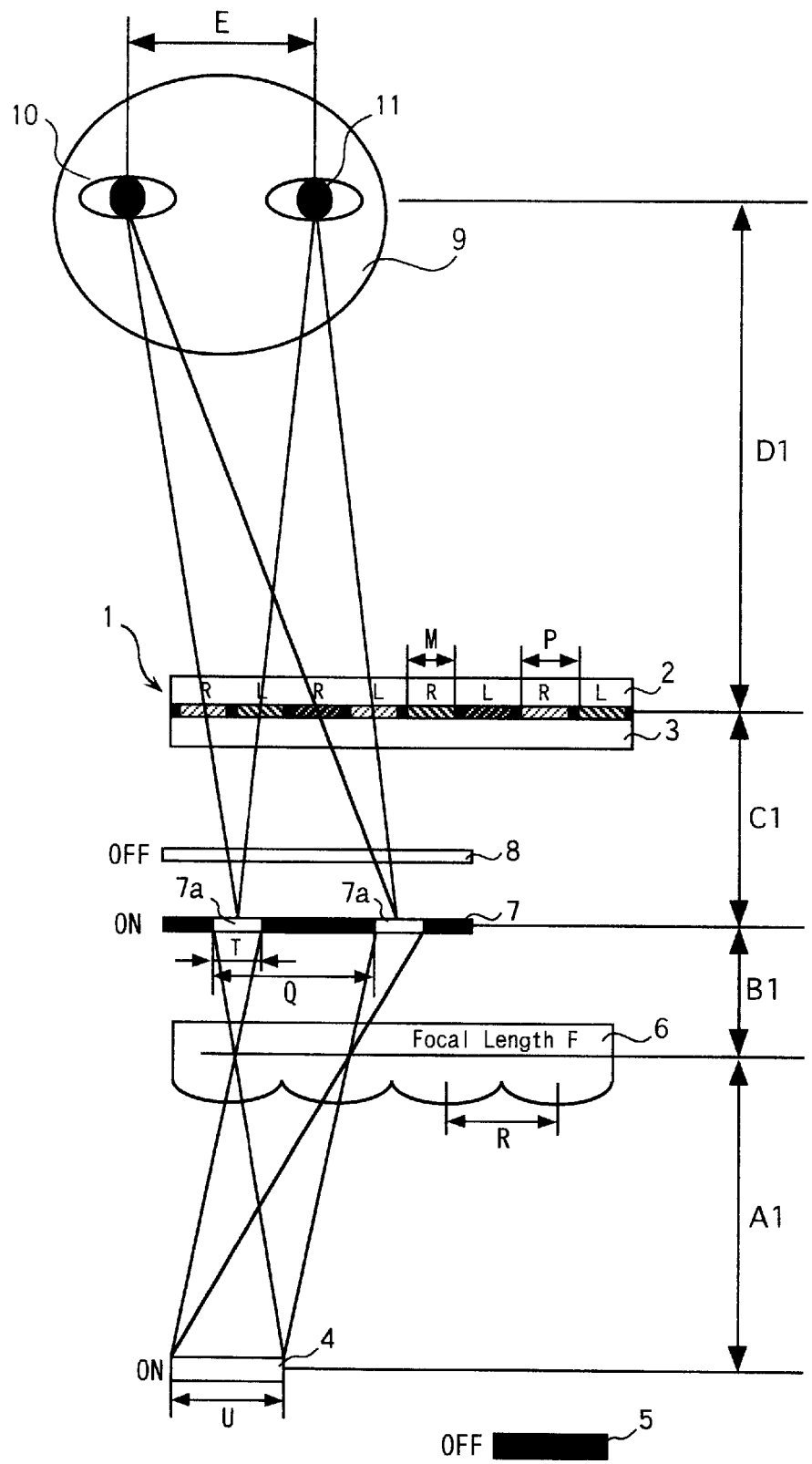
FIG. 1 is a plane view illustrating a structure in which a viewer views a stereoscopic image from a long-distance viewing position in a first embodiment of the present invention.

The foregoing and other objects, features, aspects and advantages of the present invention will become more apparent from the following detailed description of the present invention when collected conjunction with the accompanying drawings.

DESCRIPTION OF THE PREFERRED EMBODIMENTS

Embodiments of the present invention will be described in detail by referring to the drawings.

Figure 2:
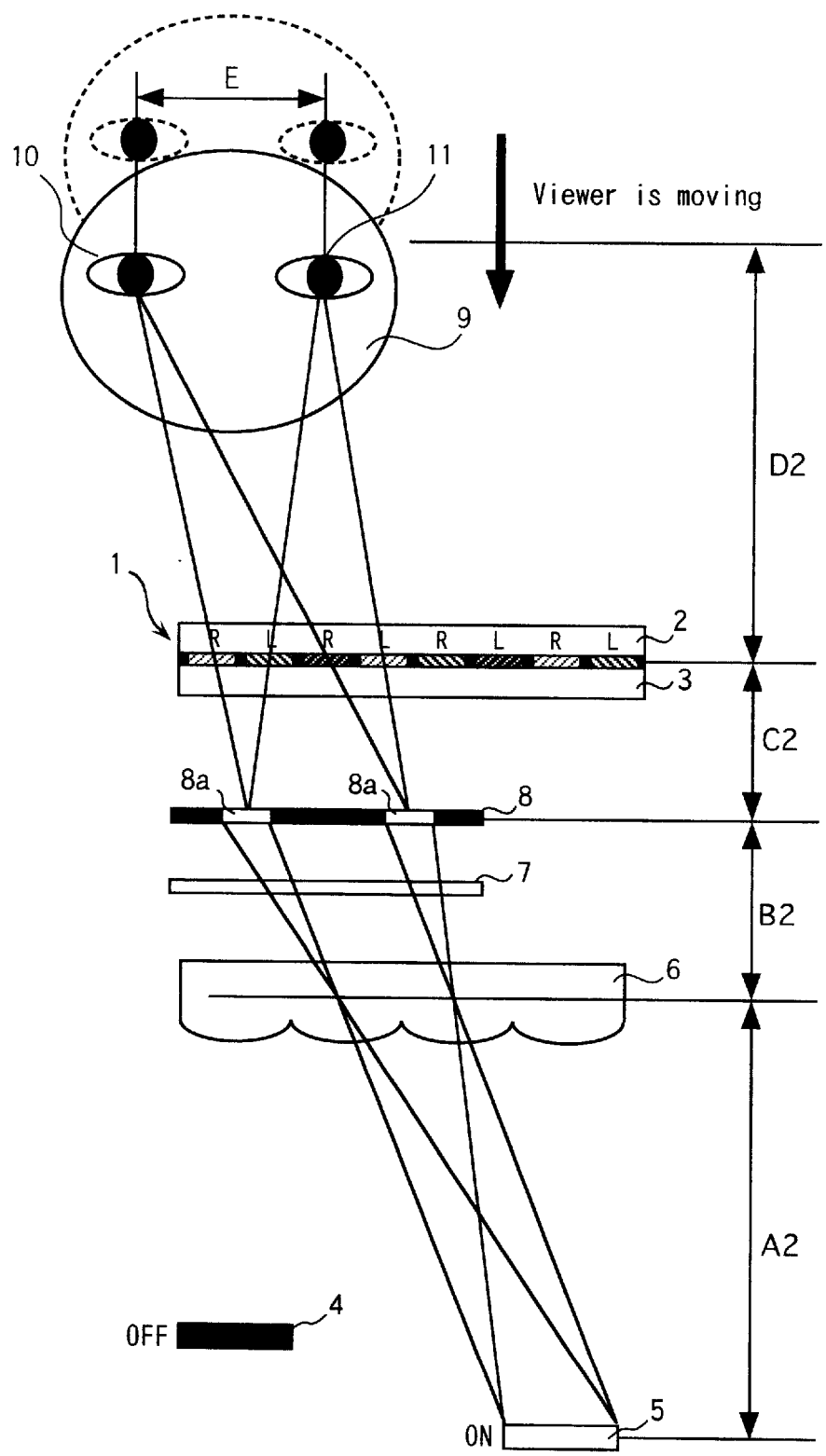
FIG. 2 is a plane view illustrating a structure in which the viewer views the stereoscopic image from a short-distance viewing position in the first embodiment of the present invention.

FIG. 1 is a plane view illustrating a structure in which a viewer views a stereoscopic image from a long-distance viewing position in a first embodiment of the present invention. FIG. 2 is a plane view illustrating a structure in which a viewer views a stereoscopic image from a short-distance viewing position in the first embodiment of the present invention.

In FIG. 1, a reference numeral 1 indicates an LCD panel for displaying an image. Reference numerals 2 and 3 are respectively a front glass substrate and a back glass substrate of the LCD panel 1. A right eye image and a left eye image are alternately displayed on every other vertical line on the LCD panel 1. "R" indicates a right eye image and "L" indicates a left eye image in FIG. 1.

Two systems of light sources 4 and 5 are arranged behind the LCD panel 1. Although one unit of each light source 4 and 5 is illustrated in FIG. 1 and 2, a plurality of light sources can be arranged. In the FIG. 1 state, the first light source 4 is on and the second light source 5 is off in accordance with a position of a viewer 9. In the FIG. 2 state, the first light source 4 is off and the second light source is on in accordance with a position of the viewer 9.

A shading plate (not shown) is arranged in front of the light sources 4 and 5 to improve the accuracy of the line width of the light sources 4 and 5. The shading plate has an aperture corresponding to the light sources 4 and 5. Light from the light sources 4 and 5, which are on, is emitted to the LCD panel 1 only through the aperture of the shading plate.

A lenticular screen 6 having lenticular lenses, which are arranged in a horizontal direction, shrink striped light images from the light sources 4 and 5, and form the striped light images at the same interval, is arranged in front of the light sources 4 and 5. A first diffusing plate 7 and a second diffusing plate 8, which consist of dispersion type liquid crystal and form the striped light images, are arranged in this order in front of the lenticular screen 6.

The diffusing plates 7 and 8 are composed by interposing a dispersion type liquid crystal layer between transparent sheets. As examples of the dispersion type liquid crystal, polymer dispersion liquid crystal (PDLC) where microdroplets of neumatic liquid crystal is encapsulated in polymer matrices or liquid crystal is dispersed in mesh of polymer are available. The PDLC may transmit the light when voltage is applied to the liquid crystal material and diffuse the light when voltage is not applied, or instead, it may transmit the light when voltage is not applied and diffuse the light when voltage is applied.

In the first embodiment, the first diffusing plate 7 has a diffusing effect when the viewer is at a normal long-distance viewing position and does not have the effect when the viewer is in a normal short-distance viewing position. On the other hand, the second diffusing plate 8 has a diffusing effect when the viewer is in the normal short-distance viewing position and does not have the effect when the viewer is in the normal long-distance viewing position.

Thus, as shown in FIG. 1, when the viewer is in a normal long-distance viewing position, a striped light image from the first light source 4 which is emitting light, that is, a striped light emitting image 7a is formed on the first diffusing plate 7 at an interval corresponding to the interval between pixels of the LCD panel 1. As shown in FIG. 2, when the viewer is in a normal short-distance viewing position, a striped light image from the second light source 5 which is emitting light, that is, a striped light emitting image 8a is formed on the second diffusing plate 8 at an interval corresponding to the interval between pixels of the LCD panel 1.

Right eye image R and left eye image L displayed on the LCD panel 1 are viewed by respective right eye 10 and left eye 11 of the viewer 9 because of the striped light emitting image 7a and 8a, whereby the viewer 9 can recognize a stereoscopic image.

The optical design conditions in the first embodiment of the present invention will be described.

As shown in FIGS. 1 and 2, letting E be an interval between pupils of a viewer 9, D1 be a distance from a normal long-distance viewing position, D2 be a distance from a normal short-distance viewing position, P be an interval between pixels of the LCD panel 1, M be a width of a aperture of a pixel of the LCD panel 1, C1 be a distance between the LCD panel 1 and a first diffusing plate 7, C2 be a distance between the LCD panel 1 and a second diffusing plate 8, B1 be a distance between the first diffusing plate 7 and a center of a lens of a lenticular screen 6, B2 be a distance between the second diffusing plate 8 and a center of a lens of the lenticular screen 6, R be an interval between lenses of the lenticular screen 6, F be a focal distance of a lens of the lenticular screen 6, A1 be a distance between a center of the lens of the lenticular screen 6 and the first light source 4, A2 be a distance between a center of a lens of the lenticular screen 6 and the second light source 5, U be a width of the first light source 4 and the second light source 5, Q be an interval between the light sources 4 and 5 formed on the diffusing plate 7 and 8, and T be a width of the light sources 4 and 5 formed on the diffusing plate 7 and 8, following equations can be satisfied.

$(D1+C1)=P:C1$ $(D1+C1)=2P:D1$ $1/A1+1/B1=1/F$ $$R:A1=Q:(A1+B1)$$

$$T:B1=U:A1$$

or $$(D2+C2)=P:C2$$

$$(D2+C2)=2P:D2$$

$$1/A2+1/B2=1/F$$

$$R:A2=Q:(A2+B2)$$

$$T:B2=U:A2 \qquad \text{[Equation 1]}$$

The above equation 1 introduces following relations.

$$D1=C1(E-P)/P$$

$$Q=2E\cdot R/(E-P)$$

$$A1=B1\cdot F/(B1-F)$$

$$R=2E\cdot P\cdot A1/\{(A1+B1)\times(E-P)\}$$

or $$D2=C2(E-P)P$$

$$A2=B2\cdot F/(B2-F)$$

$$R=2E\cdot P\cdot A2/\{(A2+B2)\times(E-P)\} \qquad \text{[Equation 2]}$$

The position of the first light source 4 or the second light source 5, and the position of the first diffusing plate 7 or the second diffusing plate 8, must satisfy the above equation 2. It is impossible to overlap the first light source 4 and the second light source 5.

A light emitting ratio T/Q of the striped light emitting image 7a and 8a formed on the diffusing plate 7 and 8 should be same as an aperture ratio of the light source, as disclosed in Japanese Laid-Open Gazette No. 287196/1995, because the light emitting ratio same as the aperture ratio has a superior characteristic. In order to equalize the light emitting ratio and the aperture ratio, the following relation should be satisfied.

When $P/2 \leq M < 2P/3$, $$/(2P) \leq T/Q \leq M/(2P),$$

therefore $$/(E-P) \leq T \leq E\cdot M/(E-P)$$

When $M<P/2$ $$(P-M)/(2P)$$

therefore $$/(E-P)$$

When $2P/3 \leq M < P$, $$/(2P)<T/Q \leq (P-M)/P$$

therefore $$/(E-P)<T \leq 2E(P-M)/(E-P) \qquad \text{[Equation 3]}$$

Figure 3:
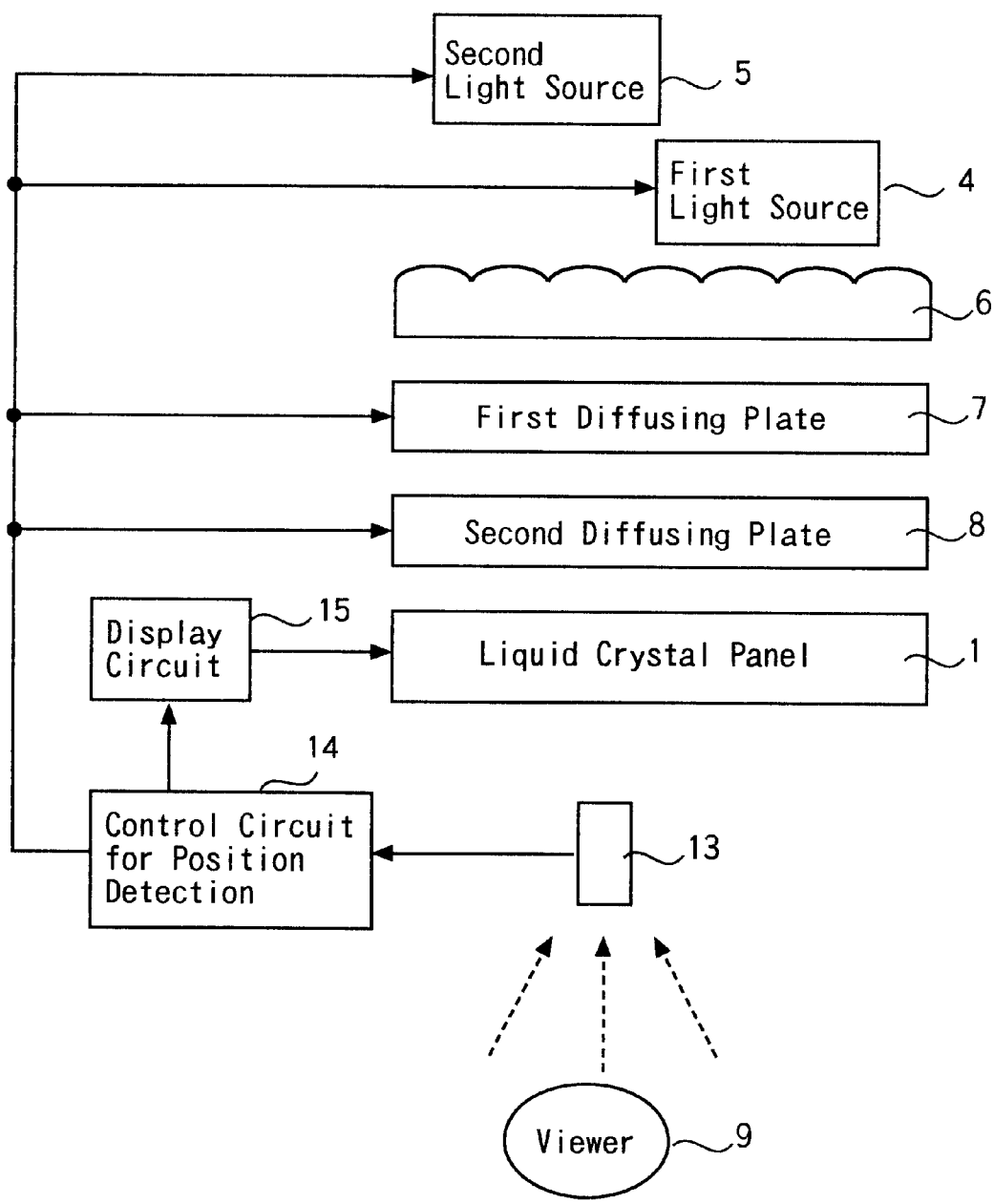
FIG. 3 is a block diagram illustrating a structure of a stereoscopic display according to the present invention.

FIG. 3 is a block diagram illustrating a structure of a stereoscopic display according to the present invention.

A sensor 13 for detecting a position of a viewer who views a stereoscopic image displayed on a LCD panel 1, sends an output to a control circuit for position detection 14. The control circuit for position detection 14 detects whether the viewer is in a short-distance viewing position or a long-distance viewing position by the output from the sensor 13. Then, in accordance with this detected information, the circuit 14 sends a control signal to drive the first light source 4, the second light source 5, the first diffusing plate 7, and the second diffusing plate 8. The control circuit for position detection 14 also detects whether the viewer's head is in a stereoscopic viewing area or a pseudo-stereoscopic viewing area by the output from the sensor 13 and sends the control signal corresponding to the area to a display circuit 15.

The display circuit 15 generates an image signal for a left eye and an image signal for a right eye to be displayed on the LCD panel 1 and sends the signals to the LCD panel 1. The display circuit 15, as shown in FIG. 1 and 2, sends the signals to the LCD panel 1 to display a left eye image and a right eye image on the basis of the output from the control circuit for position detection 14 when the viewer's head is in the stereoscopic viewing area. And the display circuit 15 switches signals to display a left eye image and a right eye image on the basis of the output from the control circuit for position detection 14 and sends them to the LCD panel 1.

When the control circuit for position detection 14 detects that the viewer is in the long-distance viewing position, it controls to turn on the first light source 4 and work up a diffusing effect of the first diffusing plate 7. When the control circuit for position detection 14 detects that the viewer is in the short-distance viewing position, it controls to turn on the second light source 5 and work up a diffusing effect of the second diffusing plate 8.

Thus, when the viewer is in the long-distance viewing position D1, as shown in FIG. 1, the control circuit 14 works up a diffusing effect of the first diffusing plate 7, whereby the striped light emitting image from the first light source 4 is formed on the diffusing plate 7, and shuts down a diffusing effect of the second diffusing plate 8, whereby the second diffusing plate 8 becomes transmissive. In the present embodiment, a diffusing effect is shut down when applying voltage to a dispersion type liquid crystal panel, therefore, voltage is applied to the dispersion type liquid crystal panel of the second diffusing plate 8.

As described above, the viewer 9 can view a stereoscopic image from a long-distance viewing position D1 by working up a diffusing effect of the first diffusing plate 7 which is farther from the LCD panel 1, and shutting down a diffusing effect of the second diffusing plate 8 which is closer to the LCD panel 1.

A case where a viewer is in the short-distance viewing position D2 which is closer than the position D1 in FIG. 1 will be described. When the viewer is in a short-distance viewing position, as shown in FIG. 2, a diffusing effect of the second diffusing plate 8 is worked up, whereby the striped light emitting image from the second light source 5 is formed on the diffusing plate 8 and a diffusing effect of the first diffusing plate 7 is shut down to make the first diffusing plate 7 to be transmissive. In this embodiment, a diffusing effect is shut down when applying voltage into a dispersion type liquid crystal panel, therefore, voltage is applied into the dispersion type liquid crystal panel of the first diffusing plate 7.

As described above, the viewer 9 can view a stereoscopic image from a short-distance viewing position D2 when a diffusing effect of the second diffusing plate 8 which is closer to the LCD panel 1 works up, and a diffusing effect of the first diffusing plate 7 which is farther from the LCD panel 1 shuts down.

In a case where the viewer's head moves leftward and rightward with respect to the LCD panel 1, a stereoscopic view can be realized by switching a right eye image and a left eye image at the display circuit 15. Regarding the viewer's back and forth movement, when the viewer is in the vicinity of D1 and views an image from a long-distance, as shown in FIG. 1, the first light source 4 is turned on, a diffusing effect of the first diffusing plate 7 is worked up, and a diffusing effect of the second diffusing plate 8 is shut down. And when the viewer is in the vicinity of D2 and views an image from a short distance, as shown in FIG. 2, the second light source 5 is turned on, a diffusing effect of the second diffusing plate 8 is worked up and a diffusing effect of the first diffusing plate 7 is shut down. That realizes a stereoscopic view in both front and back stereoscopic viewing areas. Thus, the area where a stereoscopic image can be viewed doubles in both back and forth directions.

In the above embodiment, two sets of a light source and a diffusing plate are used to display a stereoscopic image at two front and back viewing positions. It is also possible to further obtain a viewing position by increasing a set of a light source and a diffusing plate, for example three or four viewing positions corresponding to the number of sets of a light source and a diffusing plate.

In a stereoscopic display according to the first embodiment, when the viewer's eyes shift to a pseudo-stereoscopic viewing position, the viewer can view a normal stereoscopic image by switching the right and left images. However, a crosstalk region or a black region exists between the region R where the right eye image can be viewed and the region L where the left eye image can be viewed. When the viewer's eyes move from the stereoscopic position to the pseudo-stereoscopic position, the viewer finds a crosstalk region or a black region during switching the right eye image and the left eye image, whereby the viewer views a blurred overlapped image or a moire image and can not enjoy a clear stereoscopic view. An object of the second embodiment according to the present invention is to provide a stereoscopic display in which the unclear stereoscopic view given to a viewer in switching the right eye image and the left eye image on a screen corresponding to a position of the viewer's head can be eliminated. In the second embodiment, a region where a crosstalk region or a black region reaches to the viewer's eyes and causes a blurred image or a moire image is referred as a moire region.

Figure 4:
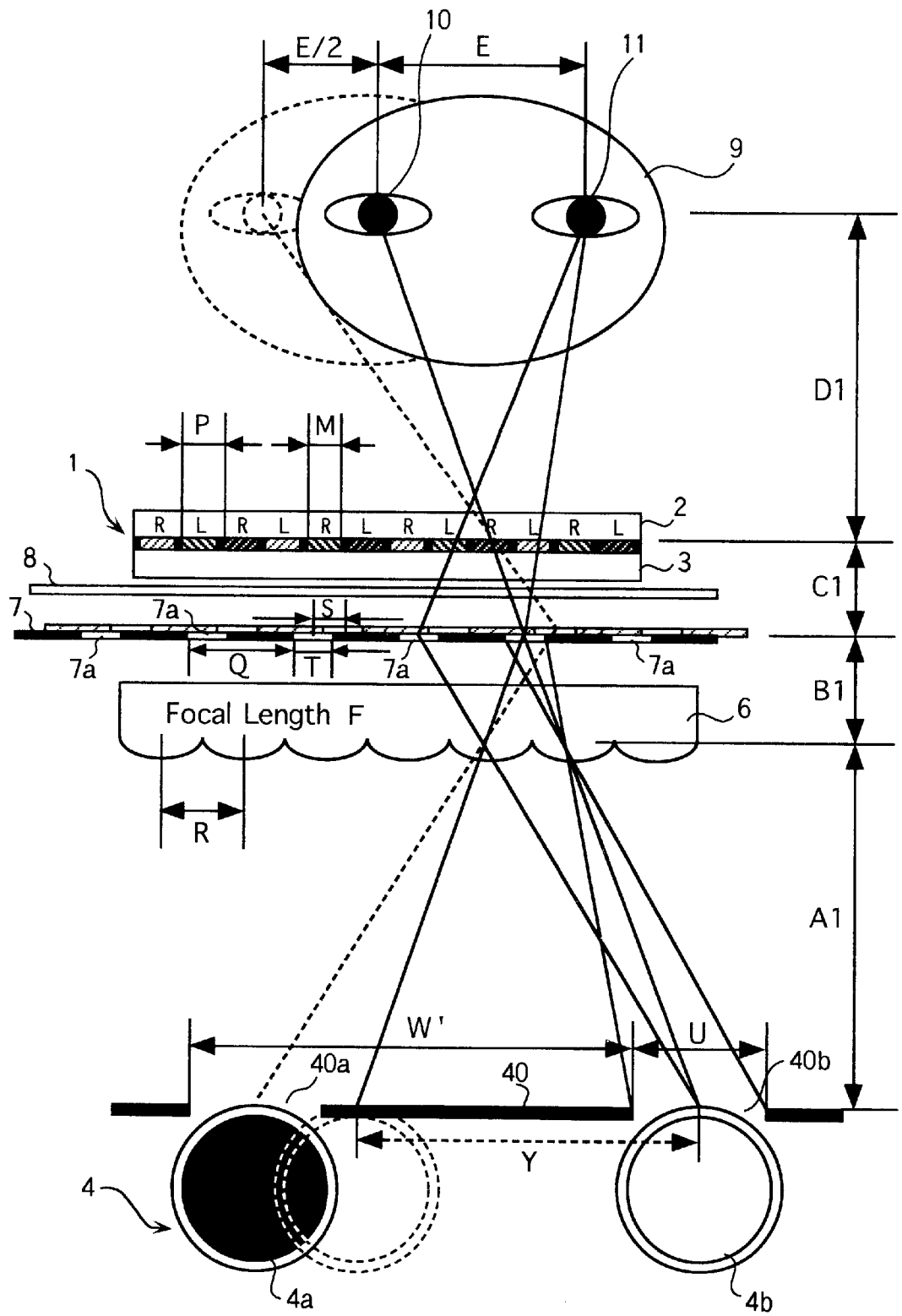
FIG. 4 is a plane view illustrating a structure when the viewer views a stereoscopic image from a long-distance viewing position in a second embodiment of the present invention.

In the second embodiment, two systems of a light source are used for a first light source 4 and a second light source 5. FIG. 4 illustrates the first light source 4. Since the construction of the light sources 4 and 5 are same, the second light source 5 is not shown in FIG. 4.

As above described, two systems of light sources. 4a and 4b are arranged as a first light source 4. Although one unit of each light source is illustrated in FIG. 4, a plurality of light sources can be arranged. In the FIG. 4 state, the light source 4a being on is turned off and the light source 4b being off is turned on in accordance with the position of the viewer 9.

A shading panel 40 is arranged in front of the light sources 4a and 4b to improve an accuracy of a width of the light sources 4a and 4b. The shading plate 40 is provided with apertures 40a and 40b respectively corresponding to the light sources 4a and 4b. Light from lighting light source 4a or 4b is emitted to an LCD panel 1 only through the apertures 40a or 40b.

A lenticular screen 6 in which lenticular lenses for shrinking striped light images from the light sources 4a and 4b and forming the images at the same interval is arranged in horizontal direction in front of the light sources 4a and 4b. First and second diffusing plates 7 and 8, which consist of dispersion type liquid crystal and forms the images, are arranged in this order.

Also in the second embodiment, a diffusing effect of the first diffusing plate 7 is worked up when a viewer is in a normal long-distance viewing position and is shut down when the viewer is in a normal short-distance viewing position. On the other hand, a diffusing effect of the second diffusing plate 8 is worked up when the viewer is in a normal short-distance viewing position and is shut down when the viewer is in the normal long-distance viewing position.

Therefore, as shown in FIG. 4, when a viewer is in a normal long-distance viewing position, a striped light image from the first light source 4 which is emitting light, that is a striped light emitting image 7a, is formed on the first diffusing plate 7 at an interval corresponding to the interval between pixels of the LCD panel 1. The right eye image R and the left eye image L displayed on the LCD panel 1 is respectively viewed by the viewer's right eye 10 and left eye 11 because of the striped light emitting image 7a, as shown in FIG. 4, whereby the viewer 9 can recognize the stereoscopic image.

The optical design conditions in the second embodiment according to the present invention will be described. Since the conditions of the first and second diffusing plate 7 and 8 and the first and second light sources 4 and 5 are same as those in the above first embodiment, those conditions are omitted.

As shown in FIG. 4, letting U be a width of an aperture 40a(40b) of a shading plate 40, Y be a distance of a light source of the first light source 4a (the second light source 4b) to form the same image on the diffusing plate 7 using lenticular lenses which are arranged side by side, W' be an interval between the first light source 4a and the second light source 4b, Q be an interval of the first light source 4a (the second light source 4b) formed on the diffusing plate 7, T be a width of the first light source 4a (or the second light source 4b) formed on the diffusing plate 7, S be a length indicating how far a striped light image from the second light source 4b formed on the diffusing plate 7 shifts from a striped light image from the first light source formed on the diffusing plate 7.

$$S:C1=E/2:D1 \quad A:1=(Q+S):B \qquad \text{[Equation 4]}$$

The above equation 1 and equation 4 introduce following relation.

$$\{2\times(E-P)\}$$
$$Y=Q\cdot A1/B1=2E\cdot P\cdot A1/\{(E-P)\times B1\} \qquad \text{[Equation 5]}$$

Above mentioned Y is satisfied when the lenticular lenses arranged side by side are used, but it is not necessary to use such lenticular lenses. For example, lens of every two lens are occasionally needed so as not to overlap the first light source 4a and the second light source 4b. Generally the interval X of the aperture 40a for the first light source 4a (or the second light source 4b) is satisfied as follows;

$$X=2n\cdot E\cdot P\,A1/\{(E-P)\times B1\} \qquad \text{[Equation 6]}$$

(n; arbitrary integer, when the light source is one, n=0) W' is satisfied as follows, in FIG. 4.

$$W'=A1(Q+S)/B1 \qquad \text{[Equation 7]}$$

With the same reason as in a case of X, W' is generally satisfied as follows $$W' = Al(NQ+S)/B \qquad \text{[Equation 8]}$$
$$= Al \cdot E \cdot P(4N+1)/\{2Bl(E-P)\}$$

(N; arbitrary natural number)

The light source including the light source 4a or 4b is required to satisfy the above equation, but it is impossible to overlap the light source 4a and 4b. Although the above conditions are applied to the first light source 4 in a case of a long-distance viewing position, the conditions also can be applied to the second light source 5 in a case of a short-distance viewing position by taking a viewing position, a position of the second diffusing plate 8 and the second light source 5 into consideration.

When the viewer moves from a base position in FIG. 1 by E/2 of an interval between a viewer's pupils rightward as shown in FIG. 4, the viewer 9 can not view a normal stereoscopic image because the viewer 9 is in a border position where a right eye image or a left eye image can be viewed. Then, the light source 4a is switched off and the light source 4b is switched on. Due to this control, the viewer can view a normal stereoscopic image even when the viewer 9 moves rightward by E/2. A right eye image and left eye image to be viewed by the viewer 9 are kept in the same state as in the base state, the LCD panel 1 continues to display a normal stereoscopic image.

When the viewer moves from a base position in FIG. 1 by E/2 of an interval of a viewer's pupils leftward, the viewer 9 can not view a normal stereoscopic image because the viewer 9 is in a border position where a right eye image or left eye image can be viewed. Then, the light source 4a is switched off and the light source 4b is switched on. Due to this control, the viewer can view a normal stereoscopic image even when the viewer 9 moves leftward by E/2. However right eye image and left eye image to be viewed by the viewer 9 are replaced, thus a right eye image and a left eye image to be displayed on the LCD panel should be switched at the same time.

FIG. 4 illustrates how the pixels look at a center position (optimum position) when the light source 4a and 4b are turned on. Regarding a region where the light source 4a and 4b are switched, when the viewer moves leftward or rightward by a length indicated as follow, from the center of the region which provides a stereoscopic image to the viewer 9 (leftward movement is indicated with -), the light source 4a is switched to the light source.

$$(4n-3)E/4 < X < (4n-1)E/4 \qquad \text{[Equation 9]}$$

(n; integer)

The light source 4a should be switched on again in a case where the viewer moves by a length indicated as follow.

$$(4n-1)E/4 \leq X \leq (4n+1)E/4 \qquad \text{[Equation 10]}$$

(n; integer)

As described above, a right eye image and a left eye image are needed to be displayed in a vertical line shape on the LCD panel 1, so as to provide an optimum stereoscopic image to the right eye 10 and left eye 11 of the viewer 9 in various states.

Although the second embodiment describes a case where the first light source 4 is on, that is, the viewer 9 is at a long-distance viewing position, the light source 5, which is on when the viewer 9 is in a short-distance viewing position, may be switched in the same manner as the light source 4.

As described above, the present invention can expand a region to back and forth direction, whereby a stereoscopic image can be viewed by switching the light source and a diffusing effect of the diffusing plate when the viewer moves forward and backward. Also the present invention can expand a normal viewing region easily by replacing the right image and the left image and switching the light source in accordance with leftward and rightward movement of the viewer.

According to the present invention, an area, where a viewer can view a stereoscopic image by using the stereoscopic display without special eye-glasses, can be expanded in back and forth, and right and left direction.

Although the present invention has been described and illustrated in detail, it is clearly understood that the same is and example only and is not to be taken by way of limitation by way of illustration, the spirit and scope of the present invention being limited only by the terms of the appended claims.

What is claimed is:

1. A stereoscopic display by which a viewer can view a stereoscopic image by striping light and giving striped light to an LCD panel consisting of a display screen containing a group of left eye pixels and a group of right eye pixels comprising;

a first light source arranged apart from said LCD panel by a first distance, a second light source arranged apart from said LCD panel by a second distance, a lenticular screen for shrinking striped light images from said light sources and forming the striped light images at the same interval, arranged in front of said first and second light sources, a first diffusing means for diffusing and transmitting light and forming a striped light image from said first light source, a second diffusing means for diffusing and transmitting light and forming a striped light image from said second light source, wherein a distance of an optimum viewing position from which a viewer can view a stereoscopic image is changed by switching between a state where said first light source is on and a said first diffusing means has a diffusing effect and a state where said second light source is on and said second diffusing means has a diffusing effect.

2. The stereoscopic display according to claim 1, comprising;

a shading plate which is arranged in front of said first and second light sources wherein;

said shading plate has apertures corresponding to said first and second light sources.

3. The stereoscopic display according to claim 1, wherein said diffusing means consists of a dispersion type LCD panel.

4. The stereoscopic display according to claim 1, wherein letting E be an interval between a viewer's pupils, P be an interval between pixels of a LCD panel, C be a distance between the LCD panel and the diffusing plate which forms a striped light image from the light source, an optimum viewing position D satisfies D=C(E-P)/P.

5. A stereoscopic display by which a viewer can view a stereoscopic image by striping light and giving striped light onto an LCD panel consisting of a display screen containing a group of left eye pixels and a group of right eye pixels comprising;

a first light source arranged apart from the LCD panel by a first distance, a second light source arranged apart from the LCD panel by a second distance, a lenticular screen for shrinking striped light images from said light sources and forming the striped light images at the same interval, arranged in front of said first and second light sources, a first diffusing means for diffusing and transmitting light and forming a striped light image from said first light source, a second diffusing means for diffusing and transmitting light and forming a striped light image from said second light source, wherein said first light source and second light source consist of a first light source for giving a stereoscopic image to a viewer who is in a certain position and a second light source for giving a stereoscopic image to a viewer who is in a position apart in a horizontal direction by approximately a half of a distance between the viewer's pupils from the certain position and, a distance of an optimum viewing position from which a viewer can view a stereoscopic image is changed by switching between a state where said first light source is on and a said first diffusing means has a diffusing effect and a state where said second light source is on and said second diffusing means has a diffusing effect.

6. The stereoscopic display according to claim 5, wherein two systems of said light sources are switched corresponding to the position of the viewer.

7. The stereoscopic display according to claim 5, comprising;

a shading plate which is arranged in front of said first light source and said second light source, wherein;

said shading plate has apertures corresponding to said first and second light sources.

8. The stereoscopic display according to claim 5, wherein said diffusing means consists of a dispersion type LCD panel.

9. The stereoscopic display according to claim 5, wherein letting E be an interval between a viewer's eyes, P be an interval between pixels of a LCD panel, C be a distance between the LCD panel and the diffusing panel which forms a striped light image from the light source, an optimum viewing distance D satisfies $D=C(E-P)/P$.

10. The stereoscopic display according to claim 5, wherein letting E be an interval between the viewer's pupils, P be an interval between pixels of the LCD panel, A be a distance between the light source and the diffusing plate for forming a striped light image from the light source and B be a distance between the diffusing plate for forming a striped light image from the light source and a center of a lenticular lens, an interval of a light source X satisfies $X=2n \cdot E \cdot P \cdot A/\{(E-P) \times B\}$, (n: arbitrary integer, when the light source is one, n=0).

11. The stereoscopic display according to claim 5, wherein;

letting E be an interval between a viewer's pupils, P be an interval between pixels of the LCD panel, A be a distance between the light source and the diffusing plate for forming a striped light image from the light source and B be a distance between the diffusing plate for forming a striped light image from the light source and a center of a lenticular lens, an interval between the first and second light sources W' satisfies $W'=A \cdot E \cdot P (4N+1)/\{2B(E-P)\}$ (N: arbitrary integer).

* * * * *